United States Patent [19]
Watson

[11] Patent Number: 6,089,145
[45] Date of Patent: Jul. 18, 2000

[54] COOKING APPARATUS

[76] Inventor: Lance Watson, 672 Rosewood Rd., Wauchope NSW2446, Australia

[21] Appl. No.: 09/360,562

[22] Filed: Jul. 26, 1999

[51] Int. Cl.$^7$ .............................. A47J 36/26; A47J 37/00
[52] U.S. Cl. .................. 99/339; 99/331; 99/337; 99/340; 99/401; 99/403; 99/422; 99/447; 99/476; 126/369; 126/377; 219/401; 219/438
[58] Field of Search ............... 99/331–336, 337, 99/338, 339, 340, 401, 403–410, 413, 421 R, 419, 422, 425, 426, 445–447, 450, 476, 467, 481; 126/275 R, 390, 369, 377, 25 R; 219/432, 433, 436, 438, 439, 401, 415, 474

[56] References Cited

U.S. PATENT DOCUMENTS

| | | |
|---|---|---|
| 2,253,833 | 8/1941 | Volks .......................................... 99/446 |
| 2,413,204 | 12/1946 | Wolff ...................................... 99/447 X |
| 3,987,719 | 10/1976 | Kian ............................................ 99/422 |
| 4,373,511 | 2/1983 | Miles et al. ............................. 126/369 |
| 4,800,865 | 1/1989 | Setzer ................................... 99/401 X |
| 4,922,079 | 5/1990 | Bowen et al. ...................... 219/432 X |
| 5,097,753 | 3/1992 | Bowen et al. ...................... 219/401 X |
| 5,107,096 | 4/1992 | Knees ................................. 219/438 X |
| 5,313,877 | 5/1994 | Holland ............................... 99/447 X |
| 5,351,068 | 9/1994 | Muchin ................................ 99/339 X |
| 5,431,091 | 7/1995 | Couture ............................... 99/447 X |
| 5,782,165 | 7/1998 | Glenboski et al. ....................... 99/340 |
| 5,873,300 | 2/1999 | Kuhlman ............................... 99/422 X |

Primary Examiner—Timothy Simone
Attorney, Agent, or Firm—Brinkley, McNerney, Morgan, Solomon & Tatum, LLP

[57] ABSTRACT

The invention concerns an apparatus for cooking food. There is a plastic housing with air flow holes, heating elements, a metal conductive pan with additional holes to allow airflow to enter the cooking chamber, a cylindrical riser, and a lid.

6 Claims, 5 Drawing Sheets

COOKING APPARATUS

BACKGROUND OF THE INVENTION

1. Field of the Invention

This invention relates to the art of food preparation for consumption, i.e. cooking. Cooking is the art and science of preparing foods usually by heating them until they are changed in one or more of the following: flavor, tenderness, appearance and chemical composition. Thus, cooking develops flavor and makes many foods more attractive in appearance. It also makes some foods easier to digest. Because the effect of food is so important to health, cooking has developed into a science and a large number of cooking apparatuses have been developed, each having claimed specific advantages covering everything from more rapid cooking and flavor enhancement to all-day simmering and vitamin retention.

2. Description of Related Art

Of the various types of cooking apparatuses, those which provide convective heating/cooking are among the most popular. However, convective cooking requires the passing of heated air over the item being cooked for a prolonged period of time. In order to do so, complicated and expensive apparatuses have been proposed which suffer the drawback of excessive retail prices.

Devices that purport to provide an even distribution of heat within the cooking chamber are known in the background art. Once such device was invented by Kiam, as disclosed in U.S. Pat. No. 3,987,719. This cooking utensil includes a pan, base and cover elements, each formed with angular, outwardly extending flanges or lips about its periphery for cooperative stacking engagement to provide a portable oven or the like. This patent further teaches a heat deflection chamber to direct the heat from the source below the basin to an oven chamber formed between the element and its matching cover.

In U.S. Pat. No. 5,107,096, Knees discloses an apparatus for cooking. The invention teaches a cooking utensil which can be used at high and low temperatures without burning the food or causing sticking. With the utilization of a container that is mounted on the stand, the invention may be used at an angle of about 45° or 90° and may permit stirring of the ingredients with the aid of a speed control stirring element.

In U.S. Pat. No. 5,873,300, Kuhlman teaches an apparatus for heating food which is comprised of a heat distributing device, a base upon which the device rests, a heat source underneath the device, and a lid resting on the base and covering the device.

A number of background devices which teach cooking utensils are as follows: Setzer, U.S. Pat. No. 4,800,865; Glenboski et al, U.S. Pat. No. 5,782,165; Miles et al, U.S. Pat. No. 4,373,511; Bowen et al, U.S. Pat. No. 4,922,079; Volks, U.S. Pat. No. 2,253,833; Wolff, U.S. Pat. No. 2,413,204.

An apparatus is needed, therefore, which provides convective cooking in a simple and inexpensive manner.

The present invention represents an improvement over the device of the aforesaid patents as will appear hereinafter.

BRIEF SUMMARY OF THE INVENTION

This invention relates to cooking devices and systems for cooking. The invention is an electric counter-top cooking apparatus which has an electric resistance heater element upon which is placed a conductive plate which acts as a cooking surface. One of the improvements is the incorporation of vent holes around the upper periphery of the cooking plate along with vent holes or slots placed in a barrier sheet which is disposed below the electric resistance heating element. The vent holes permit air to be drawn from underneath the device into the cooking area so as to realize convective heating to the food item.

The present invention includes a lid, a cylindrical riser, a metal conductive pan with holes for air flow, a non-conductive barrier within a plastic housing that includes a resistant heating element, and legs to support the plastic housing.

It is an object of the present invention to provide a portable food cooking and warming apparatus which provides convective cooking by evenly passing intensely heated air over the item being cooked, while simultaneously frying and baking the food item.

A further object of the present invention is to provide a food cooking and warming apparatus which can be placed safely on any table top.

Another object of this invention is to provide a device for uniformly and evenly cooking and warming food without burning it or causing hot spots.

Yet another object of this invention is to provide a cooking and warming apparatus with an efficient and economical heat source.

In accordance with these and other objects which will become apparent hereinafter, the instant invention will now be described with particular reference to the accompanying drawings.

DETAILED DESCRIPTION OF THE INVENTION

Figure 1:
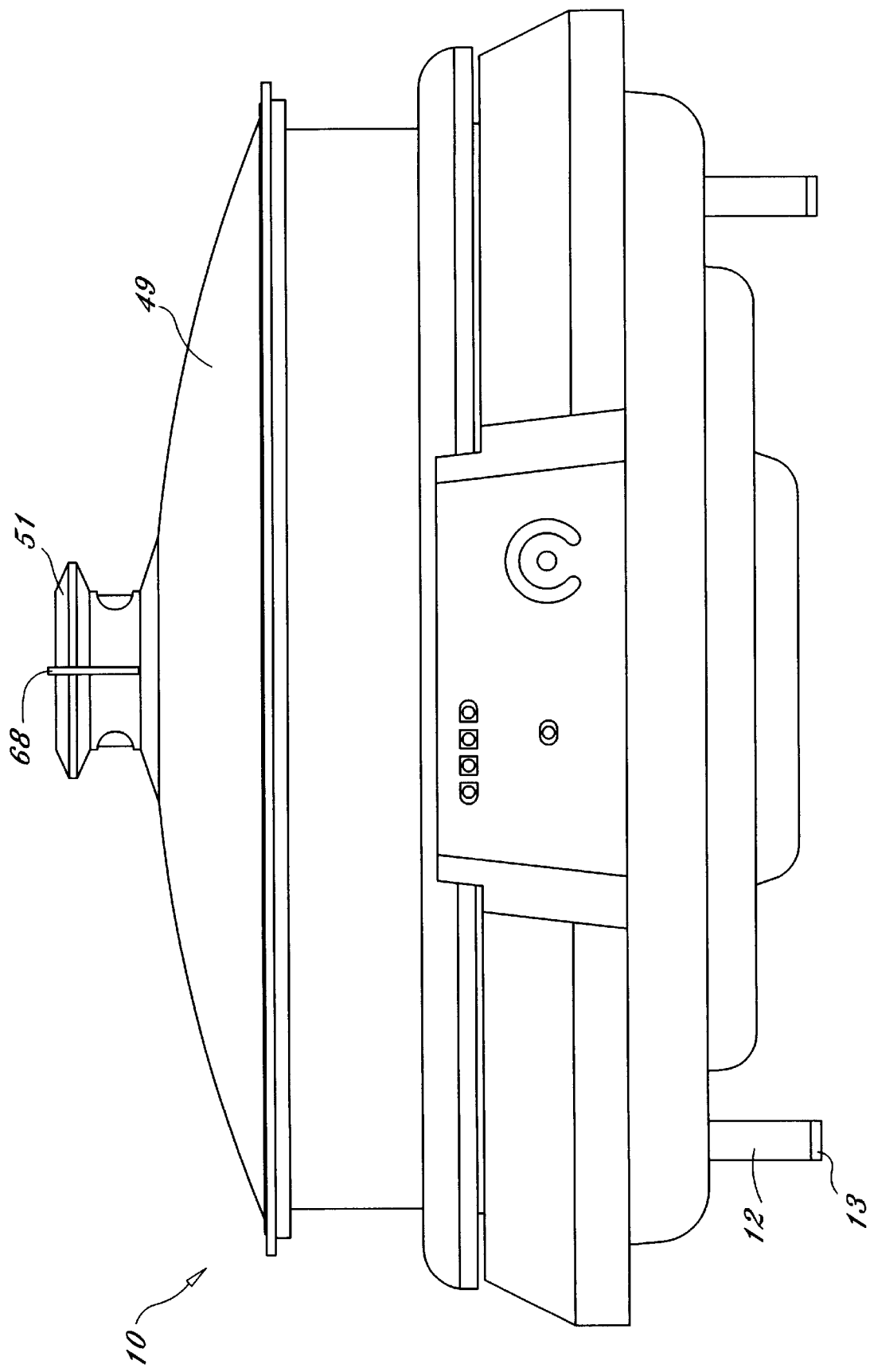
FIG. 1 is an elevational view of a preferred embodiment of the cooking apparatus shown in vertical cross-section.
Figure 2:
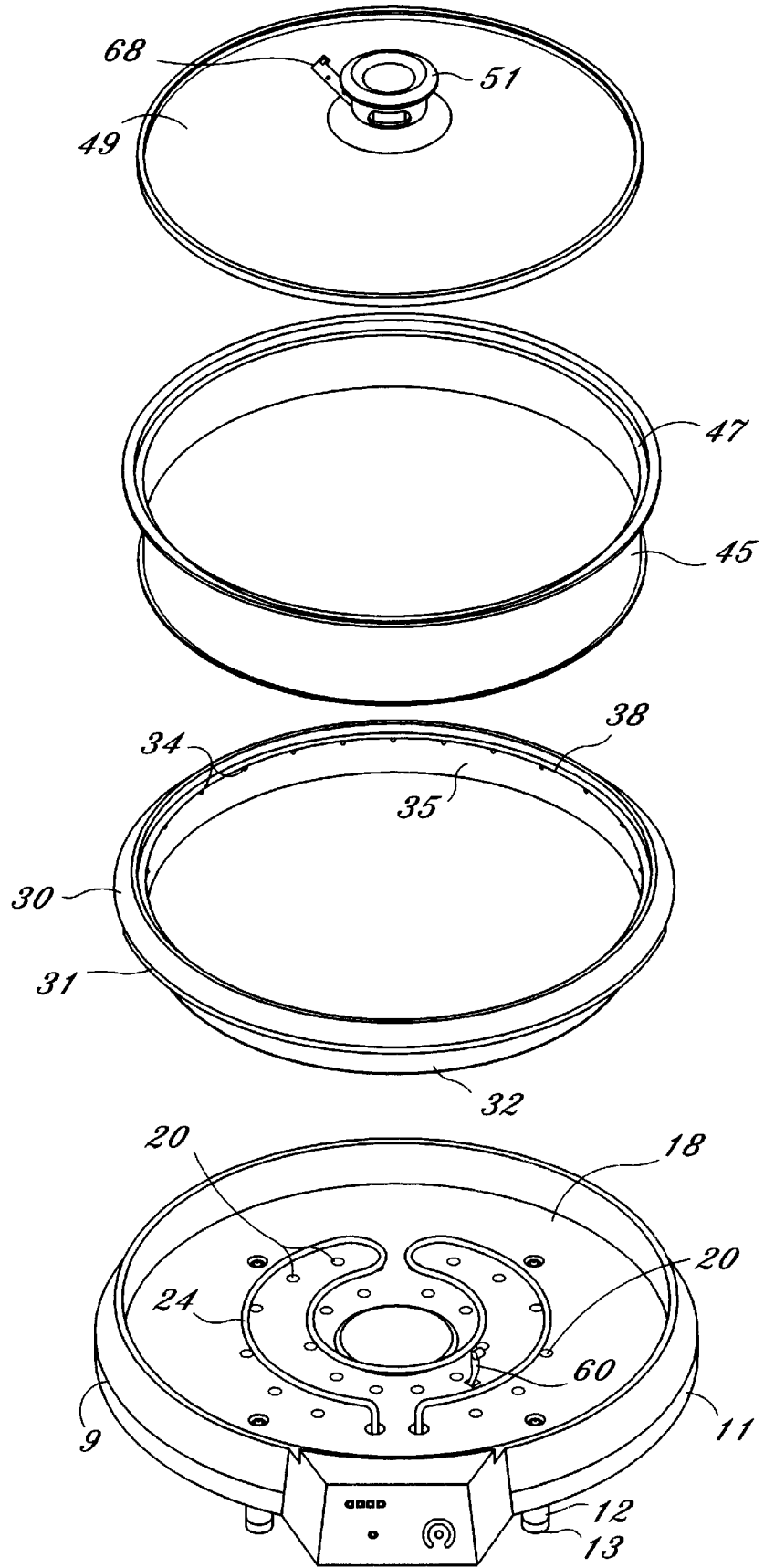
FIG. 2 is an exploded perspective view of the embodiment of the invention shown in FIG. 1.
Figure 3:
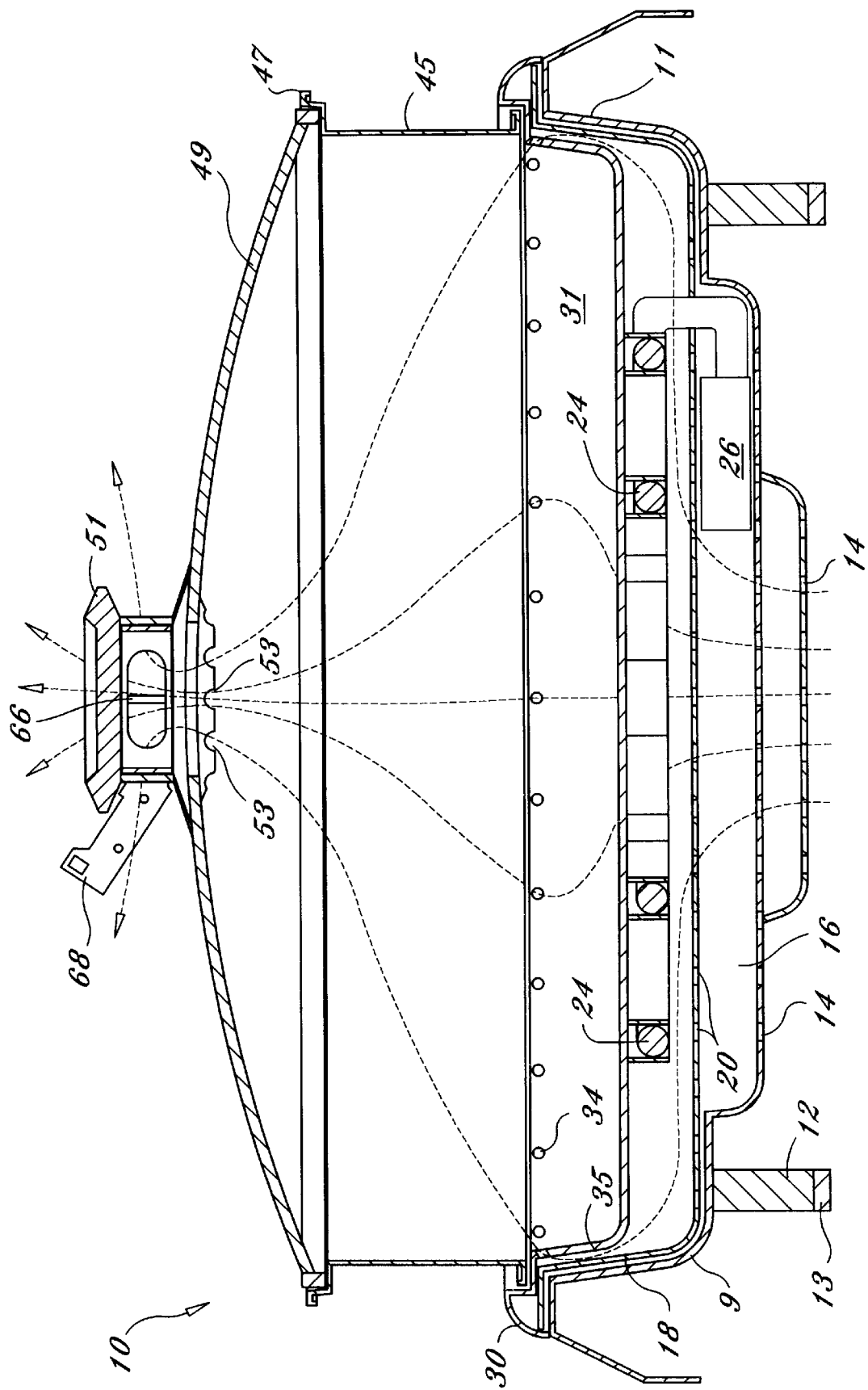
FIG. 3 is an assembled cross-sectional elevational view of the invention.
Figure 4:
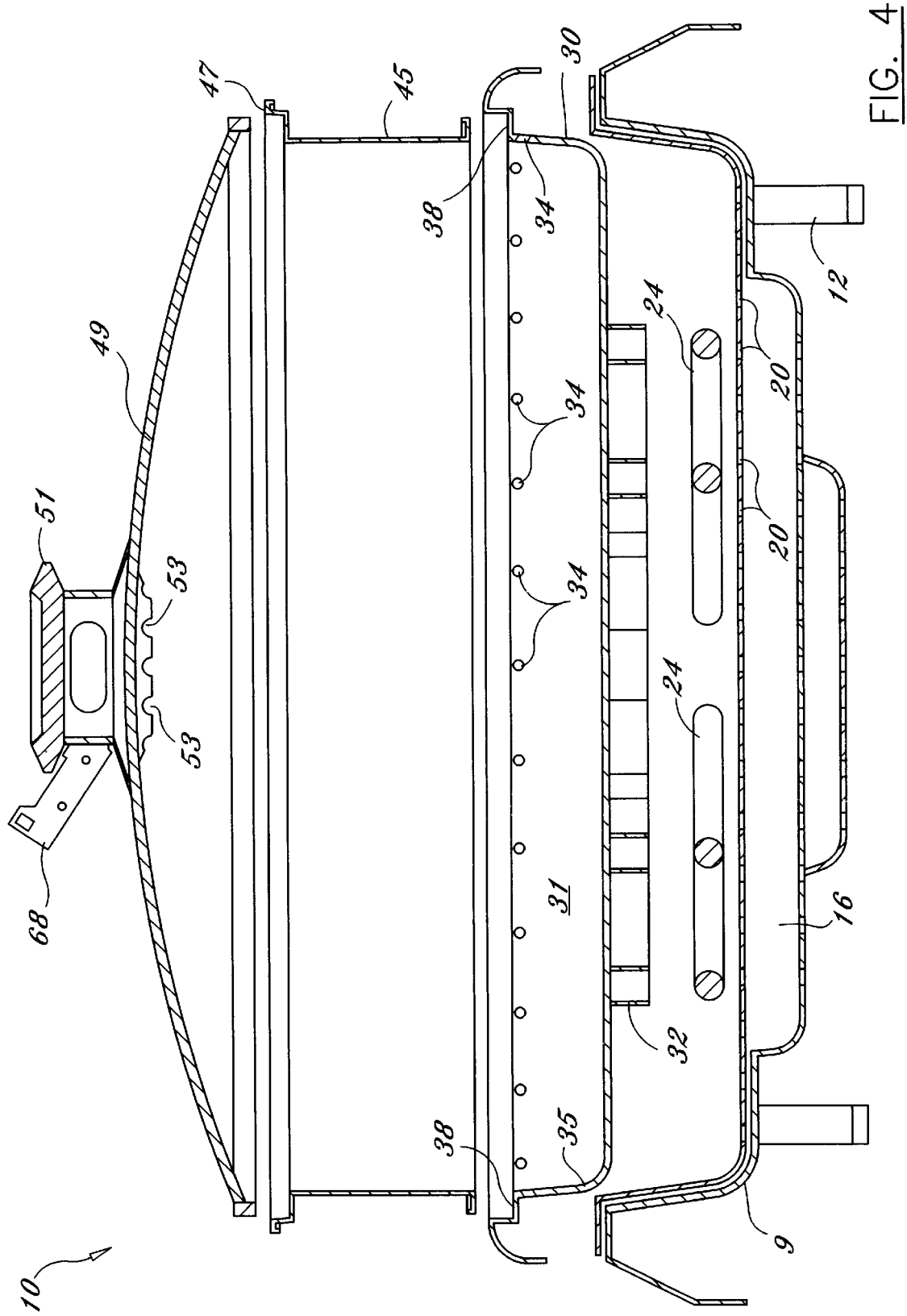
FIG. 4 is an exploded elevational view of the invention in cross-section.
Figure 5:
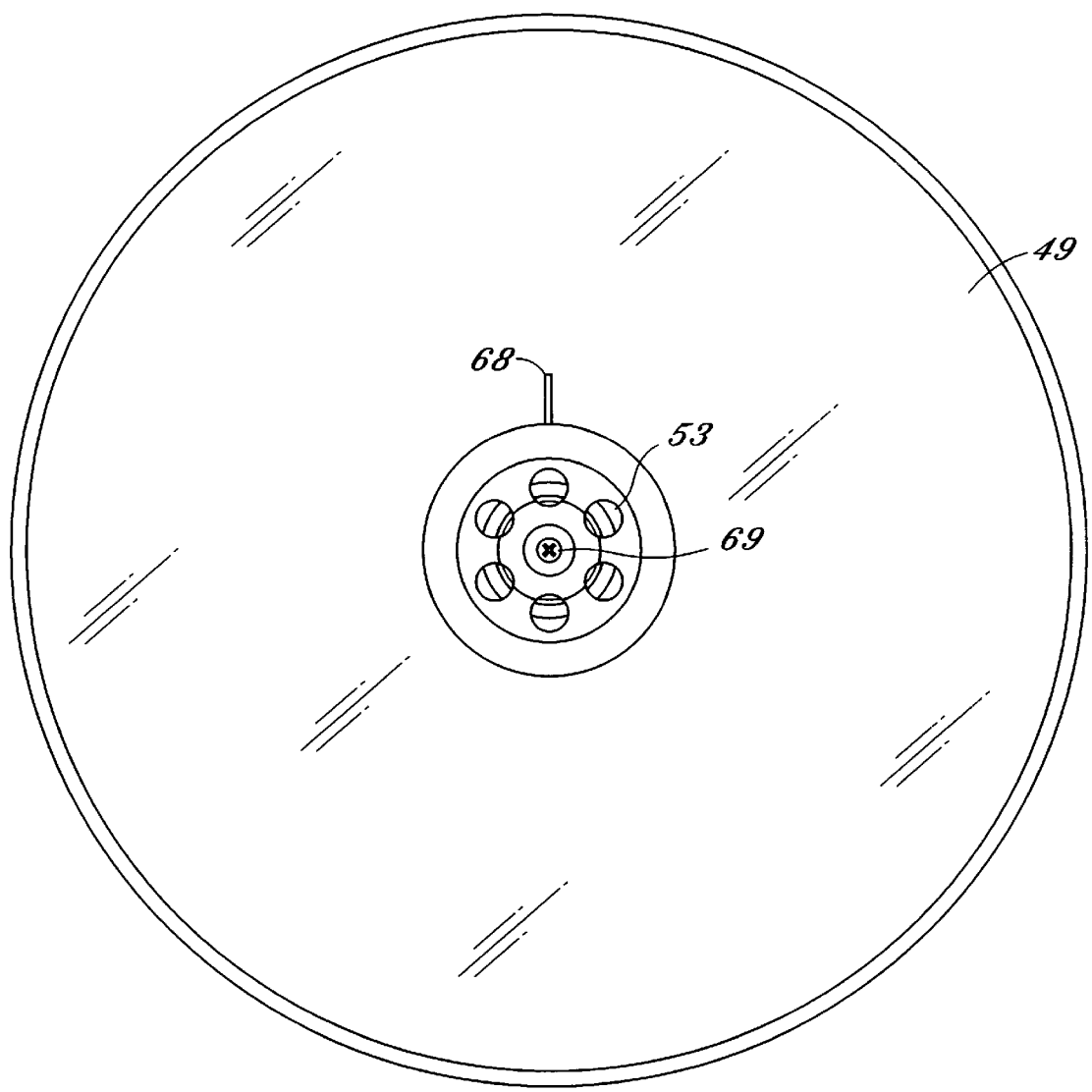
FIG. 5 is a bottom view of an embodiment of a cover for use with this invention.

Referring now to the drawings, the present invention is shown generally at 10. Plastic housing 9 has legs 12 to support the device on a surface. Housing 9 defines a series of air flow holes 14 in the underside thereof to allow air to flow into a space 16 between housing 9 and non-conductive barrier 18. Barrier 18 may be an aluminum or otherwise thermally non-conductive pan with holes or slots 20 defined therein to permit air to flow from space 16 across resistance heating element 24.

The device has a conductive metal pan 30, which defines a cooking space 31, adapted to be seated upon heating element 24 and held in place against rotation thereon by interfitting channel 32 which generally conforms to the shape of the heating element 24. Heating element 24 may be in any desired shape such as curved or straight rods. The pan 30 includes air flow slots or holes 34 disposed in sidewall 35 below shoulder 38 thereof. Holes 34 may be spaced uniformly about the upper periphery of wall 35 to allow air to flow from space 16 into space 31. Holes 34 may also take the shape of elongated slots.

A riser 45 may be employed to increase the volume of cooking space 31. A lid 49 is adapted to be seated upon the upper peripheral edge 47 of riser 45. Lid 49 is provided with vent apertures 53 either in handle 51 or elsewhere in the lid to allow air to flow from space 16 to the atmosphere above lid 49 through space 31.

A power source 26 is utilized to energize heating element 24. Spacers 13 below two of the four legs 12 can be used to tilt housing 9 in such a way that any unwanted liquids (e.g. melted fat) exit through a drain aperture defined in pan 30 which in turn will drain into a suitable collection receptacle which is removable for dumping and cleaning.

A switch 60 may be connected between power source 26 and resistance heating elements 19 which causes power to be interrupted to the heating elements when pan 30 is removed from its place in contact with resistance element 19.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A device for simultaneously frying and convectively cooking food items, comprising:

a generally circular cooking member having a central imperforate planer area and an upwardly directed peripheral sidewall ending in an upper peripheral shoulder;

a shield member underlying said cooking member and, together with a bottom surface of said cooking member, defining a heating space therebetween;

a heating element disposed within said heating space in proximity to the bottom surface of the cooking member for heating the cooking member and air passing through said heating space;

a base member underlying said shield member in supporting relationship, said shield member comprising a generally circular planar panel defining a plurality of air flow holes therein and having an upwardly directed peripheral sidewall ending in an upper peripheral nesting edge upon which a corresponding peripheral rim of said cooking member is adapted to sit;

a plurality of air flow apertures defined by said peripheral sidewall of said cooking member which fluidly communicate the cooking space with the heating space so as to permit heated air to come in direct contact with the food item and cause convective heating therewith;

a lid member adapted to the generally sealingly placed about said shoulder of said cooking member, said lid member defining a vent aperture therein to permit heated air passing from said heating space through said cooking space to the vented therethrough to permit a convective—heating air flow through said cooking space and over said food item.

2. The circular cooking member of claim 1, wherein said cooking member is placed in intimate contact with said heating element during cooking.

3. The circular cooking member of claim 1, wherein said heating element is a resistance heating coil.

4. The circular cooking member of claim 3, further comprising a nesting channel defined by the bottom surface of the cooking member which corresponds in shape to said heating element, said heating element adapted to be situated in nesting relationship in said channel when said cooking member is placed upon said heating element.

5. The circular cooking member of claim 1, further including an annular riser member interposed between a bottom peripheral edge of said lid and said shoulder of said cooking member.

6. The circular cooking member of claim 3, further comprising an annular riser member interposed between a bottom peripheral edge of said lid and said shoulder of said cooking member.

* * * * *